US011024006B2

(12) United States Patent
Smirnov et al.

(10) Patent No.: US 11,024,006 B2
(45) Date of Patent: Jun. 1, 2021

(54) TAGGING CLIPPED PIXELS FOR PYRAMID PROCESSING IN IMAGE SIGNAL PROCESSOR

(71) Applicant: Apple Inc., Cupertino, CA (US)

(72) Inventors: Maxim Smirnov, Wilsonville, OR (US); Elena Lamburn, San Jose, CA (US); Oren Kerem, Sunnyvale, CA (US); Chihsin Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 16/391,224

(22) Filed: Apr. 22, 2019

(65) Prior Publication Data

US 2020/0334787 A1    Oct. 22, 2020

(51) Int. Cl.
*G06T 3/40* (2006.01)
*G06T 3/00* (2006.01)
(Continued)

(52) U.S. Cl.
CPC .......... *G06T 3/4023* (2013.01); *G06T 3/0093* (2013.01); *G06T 3/4007* (2013.01);
(Continued)

(58) Field of Classification Search
CPC ... G06T 3/4023; G06T 3/0093; G06T 3/4007; G06T 5/009; G06T 5/30; G06T 5/50;
(Continued)

(56) References Cited

U.S. PATENT DOCUMENTS 8,233,738 B2 *   7/2012   Rempel ................. G09G 5/10
                                                          382/264
8,477,219 B2 *   7/2013   Takatori ................ G06T 5/002
                                                          348/241
(Continued)

FOREIGN PATENT DOCUMENTS

WO   WO 2017/200447 A1   11/2017

OTHER PUBLICATIONS

Qu, Z. et al., "An algorithm of image mosaic based on binary tree and eliminating distortion error," PLoS ONE 14(1), Jan. 7, 2019, 27 pages.

*Primary Examiner* — Gregory M Desire
(74) *Attorney, Agent, or Firm* — Fenwick & West LLP

(57) ABSTRACT

A portable electronic device may include an image signal processor that includes a clipping circuit, a pyramid generator circuit, and an image fusion processor. The clipping circuit clips pixel values that are under-exposed or over-exposed. The pyramid generator circuit applies a filter to the pixels of the image to generate a filtered image. Some of the filtered pixels may be generated from one or more clipped pixel values. The pyramid generator circuit identifies those filtered pixels that are generated from one or more clipped pixel values and marks the identified filtered pixels with a tag. The pyramid generator circuit decimates the filtered image to generate a downscaled image, which may include one or more filtered pixels that are marked with the tags. The image fusion processor fuses the downscaled image with (Continued)

another image. The pixels that are marked with the tags may be disregarded in the fusion process.

20 Claims, 8 Drawing Sheets

(51) Int. Cl.
  *G06T 5/30* (2006.01)
  *G06T 5/50* (2006.01)
  *G06T 5/00* (2006.01)
(52) U.S. Cl.
  CPC ............... *G06T 5/009* (2013.01); *G06T 5/30* (2013.01); *G06T 5/50* (2013.01); *G06T 2207/20016* (2013.01); *G06T 2207/20208* (2013.01); *G06T 2207/20221* (2013.01)
(58) Field of Classification Search
  CPC . G06T 2207/20016; G06T 2207/20208; G06T 2207/20221
  See application file for complete search history.

(56) References Cited

U.S. PATENT DOCUMENTS

| | | | |
|---|---|---|---|
| 8,525,900 B2* | 9/2013 | Garten | H04N 5/232 348/229.1 |
| 8,737,723 B1 | 5/2014 | Kwatra | |
| 9,305,362 B1* | 4/2016 | Szedo | G06T 7/13 |
| 10,129,437 B2 | 11/2018 | Yasutomi | |
| 10,839,487 B2* | 11/2020 | Stewart | G06F 16/51 |
| 2008/0095235 A1* | 4/2008 | Hsiang | H04N 19/635 375/240.13 |
| 2009/0167778 A1* | 7/2009 | Wei | H04N 7/014 345/587 |
| 2016/0110843 A1* | 4/2016 | Mills | H04N 9/07 348/241 |
| 2017/0069060 A1 | 3/2017 | Bagai et al. | |
| 2018/0007334 A1 | 1/2018 | Lim et al. | |

* cited by examiner

TAGGING CLIPPED PIXELS FOR PYRAMID PROCESSING IN IMAGE SIGNAL PROCESSOR

BACKGROUND

1. Field of the Disclosure

The present disclosure relates to a circuit for processing images and more specifically to generating images with downscaled resolutions.

2. Description of the Related Art

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on a central processing unit (CPU), execution of such programs on the CPU would consume significant bandwidth of the CPU and other peripheral resources as well as increase power consumption. Hence, image processing pipelines are often implemented as a hardware component separate from the CPU and dedicated to performing one or more image processing algorithms.

In generating a high dynamic range image, an image sensor system may capture different images with different exposure times. Depending on the image conditions, some of the pixels in the captured images may be under-exposed or over-exposed. The exposure of an image could affect the perceived quality of an image.

SUMMARY

Embodiments relate to an image signal processor that includes a clipping circuit and a pyramid generator circuit. The clipping circuit identifies one or more pixel values in an image that are beyond a predetermined range. The clipping circuit replaces the one or more pixel values with one or more clipped pixel values. The pyramid generator circuit applies one or more image filters to the image to generate a filtered image that includes filtered pixels. The pyramid generator circuit also identifies one or more of the filtered pixels that are generated from the one or more clipped pixel values. The pyramid generator circuit marks the identified filtered pixels with a tag. The tag indicates that the identified filtered pixels are generated from the one or more clipped pixel values. The pyramid generator circuit further decimates the filtered image to generate a downscaled image. The downscaled image has a reduced number of pixels compared to the image. The downscaled image includes one or more pixels that are marked with the tag.

Figure 1:
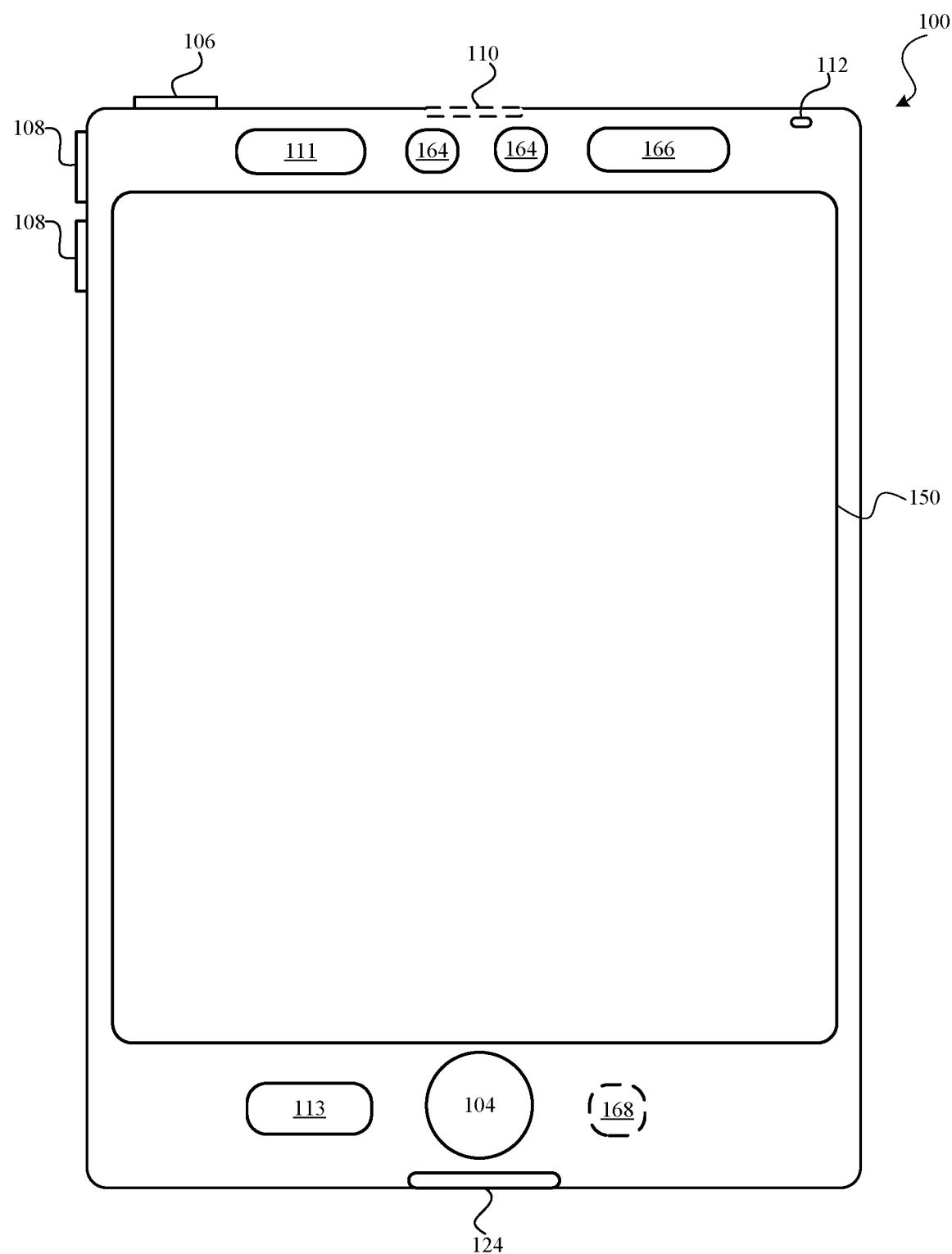
FIG. 1 is a high-level diagram of an electronic device, according to one embodiment.

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to a pyramid generator circuit of an image signal processor that marks clipped over-exposed or under-exposed pixels when a downscaled image is generated. A pyramid generator circuit may generate a series of pyramid images, which could include an unscaled image and a downscaled image, both generated from an input image. An image received by the pyramid generator circuit may include one or more clipped pixel values, which may be pixel values that are clipped from over-exposed or under-exposed pixels. In generating a downscaled image, the pyramid generator circuit applies a filter to the image to generate a filtered image. A filtered pixel in the filtered image is generated from a subset of pixels in the input image. Some of the filtered pixels may be generated from one or more clipped pixel values. The pyramid generator circuit identifies those filtered pixels that are generated from one or more clipped pixel values and marks the identified filtered pixels with a tag. The pyramid generator circuit downscales the filtered image to generate a downscaled image, which may include one or more filtered pixels that are marked with the tags. In a fusion process downstream of the pyramid generator circuit, the downscaled image is fused with another image. The pixels that are marked with the tags may be disregarded in the fusion process.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG.) 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
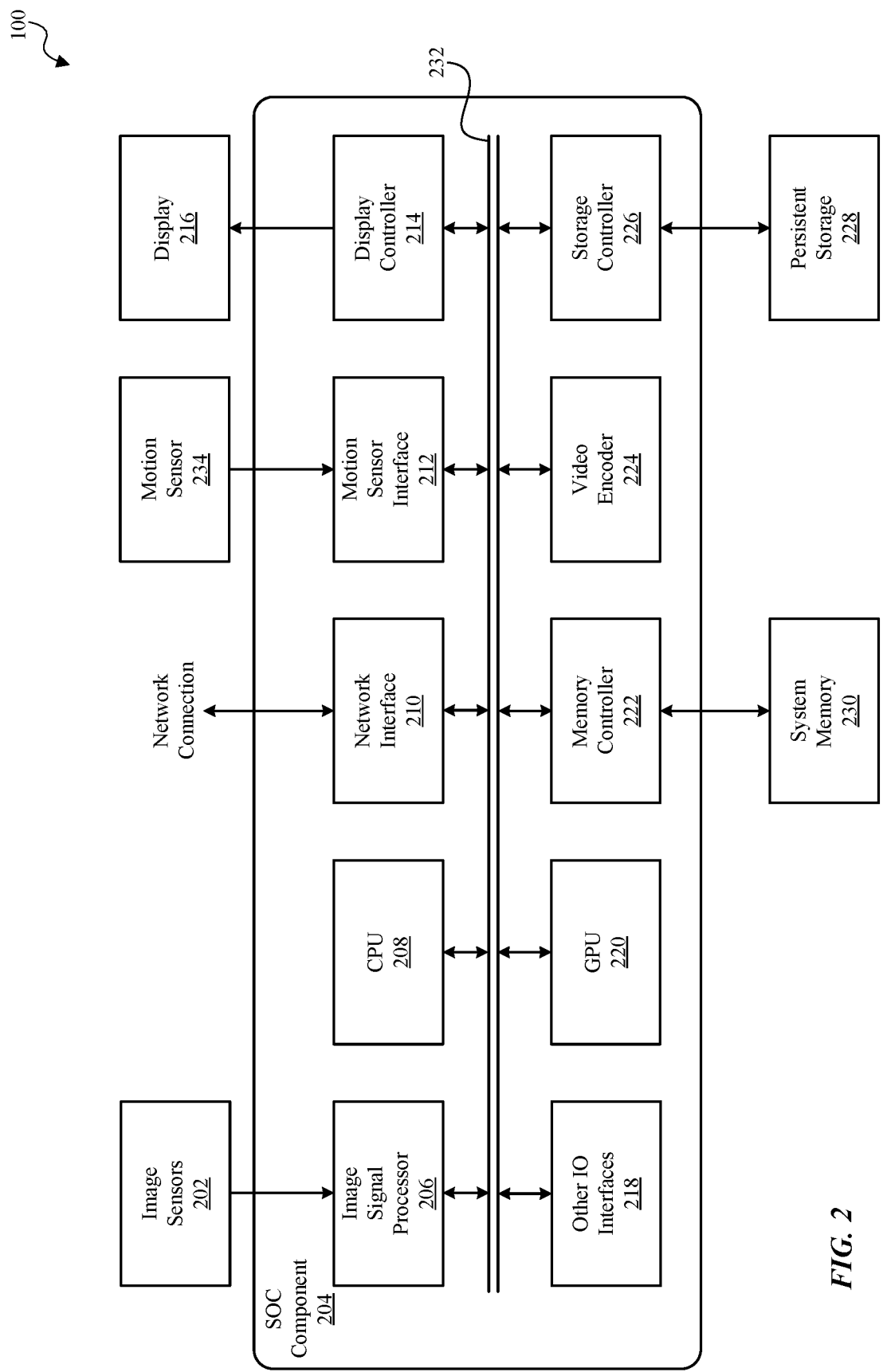
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, a liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
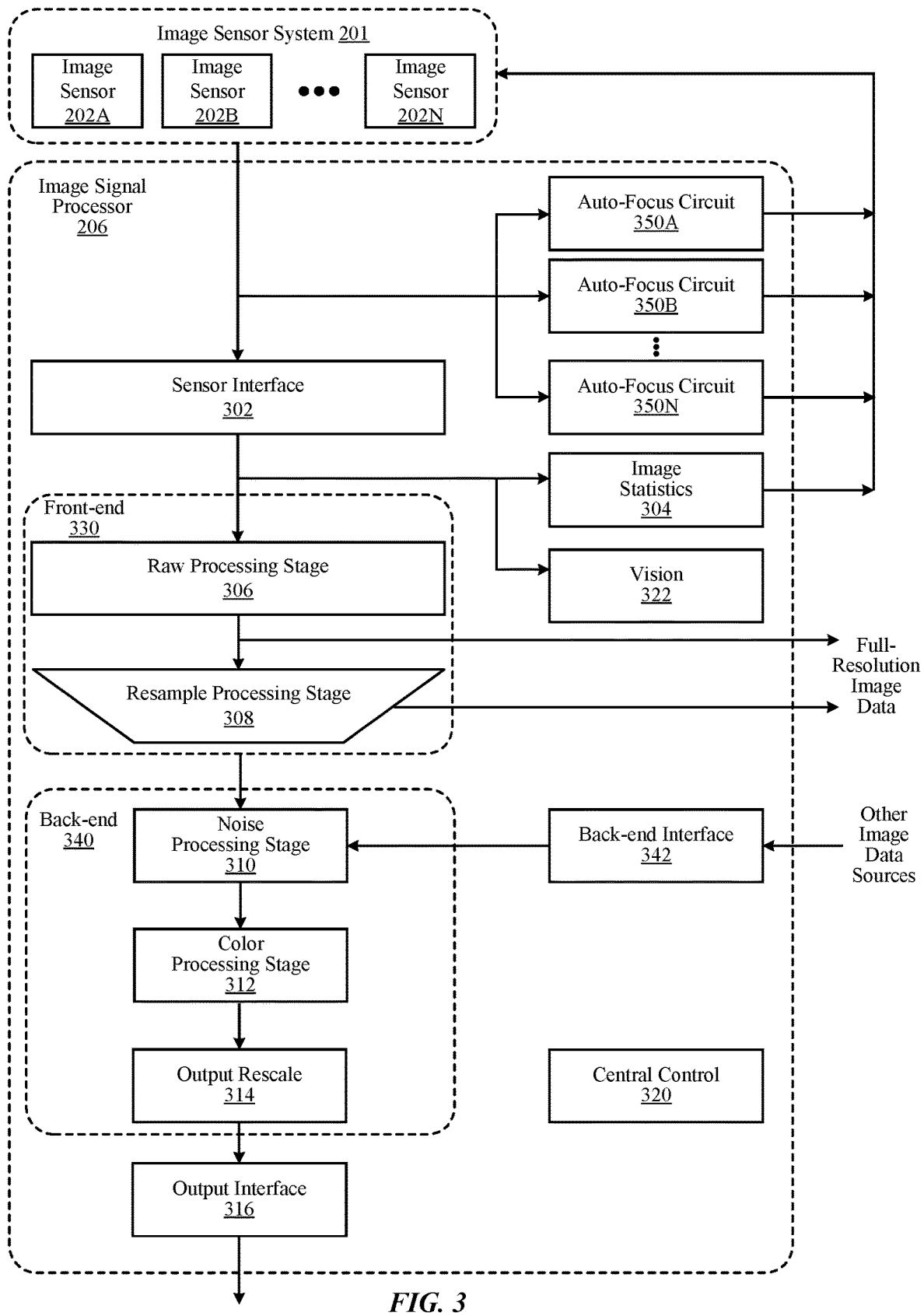
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include a hardware circuit that analyzes raw image data to determine an appropriate lens position of each image sensor 202. In one embodiment, the raw image data may include data that is transmitted from image sensing pixels that specialize in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamlessly transition from image data captured by one image sensor 202 to image data captured by another image sensor 202 without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistical data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing.

One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g. no color). In some embodiment, the luma sharpening and chroma suppression may be performed simultaneously with spatial noise filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement a series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between an input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipelines for Image Fusion

Figure 4:
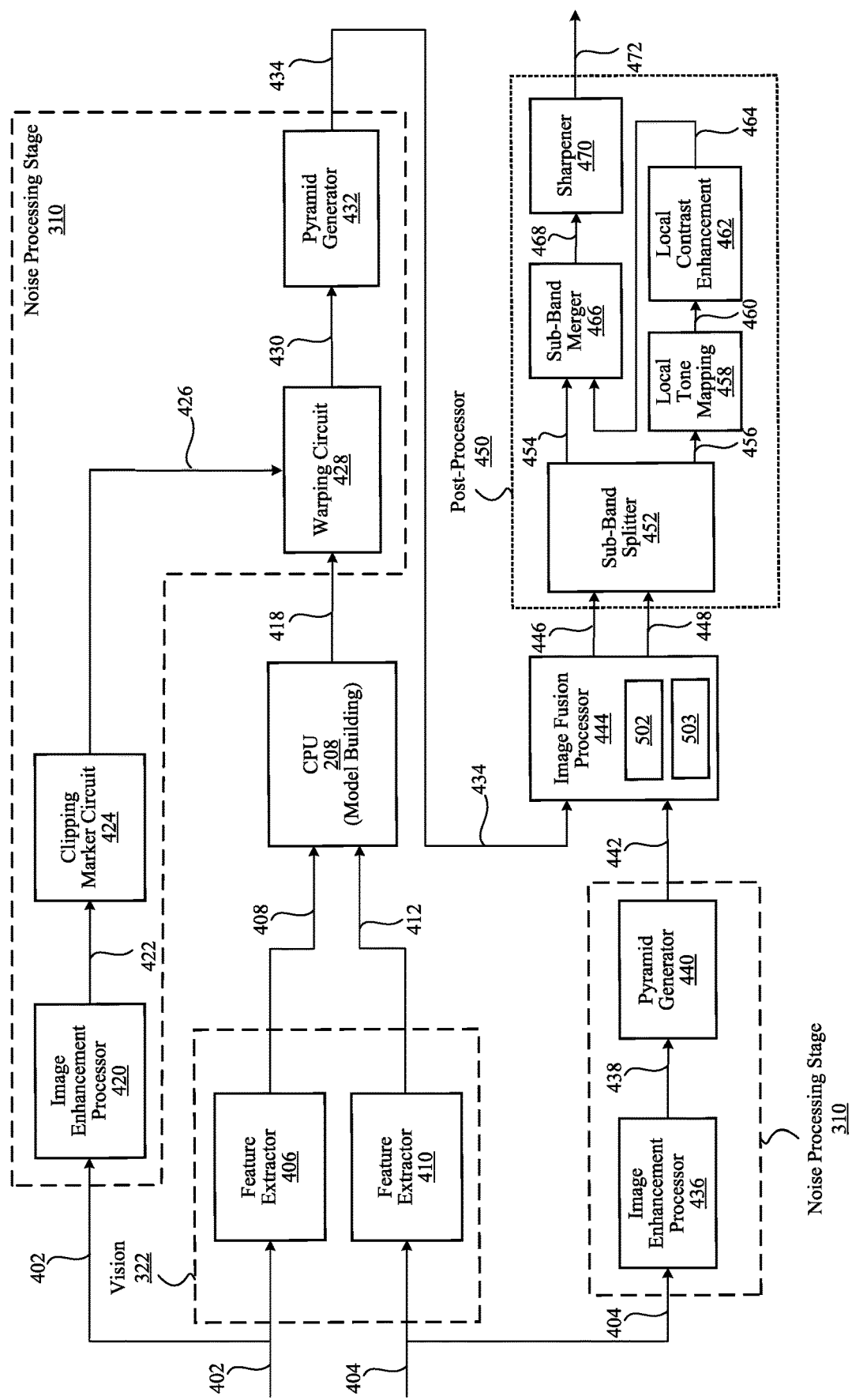
FIG. 4 is a block diagram illustrating a portion of the image processing pipeline including circuitry for image fusion, according to one embodiment.

FIG. 4 is a block diagram illustrating a portion of the image processing pipeline including circuitry for image fusion, according to one embodiment. Images 402, 404 are captured by image sensor system 201 and passed onto vision module 322. In one embodiment, image 402 is captured shortly before or after capturing image 404. Alternatively, images 402 and 404 are captured at the same time using two different image sensors 202 with different exposure times. Image 402 captures a scene with a first exposure time, and image 404 captures the same scene with a second exposure time that may be different than the first exposure time. If the second exposure time is shorter than the first exposure time, image 402 can be referred to as "long exposure image" and image 404 can be referred to as "short exposure image." Each image 402, 404 includes multiple color components, e.g., luma and chroma color components. Image 402 is passed onto feature extractor circuit 406 of vision module 322 for processing and feature extraction. Image 404 may be passed onto feature extractor circuit 410 of vision module 322 for processing and feature extraction. Alternatively, feature extractor circuit 410 may be turned off.

Feature extractor circuit 406 extracts first keypoint information 408 about first keypoints (e.g., salient points) in image 402 by processing pixel values of pixels in image 402. The first keypoints are related to certain distinguishable features (also referred to "salient points") in image 402. Extracted first keypoint information 408 can include information about spatial locations (e.g., coordinates) of at least a subset of pixels in image 402 associated with the first keypoints of image 402. For each of the first keypoints in image 402, feature extractor circuit 406 may also extract and encode a keypoint descriptor, which includes a keypoint scale and orientation information. Thus, first keypoint information 408 extracted by feature extractor circuit 406 may include information about a spatial location of each of the first keypoints of image 402 and a keypoint descriptor of each of the first keypoints of image 402. First keypoint information 408 associated with at least the subset of pixels of image 402 is passed onto CPU 208 for processing.

Feature extractor circuit 410 extracts second keypoint information 412 about second keypoints in image 404 by processing pixel values of pixels in image 404. The second keypoints are related to certain distinguishable features (e.g., salient points) in image 404. Extracted second keypoint information 412 can include information about spatial locations (e.g., coordinates) of at least a subset of pixels in image 404 associated with the second keypoints of image 404. For each of the second keypoints in image 404, feature extractor circuit 410 may also extract and encode a keypoint descriptor, which includes a keypoint scale and orientation information. Thus, second keypoint information 412 extracted by feature extractor circuit 410 may include information about a spatial location of each of the second keypoints of image 404 and a keypoint descriptor of each of the second keypoints of image 404. Second keypoint information 412 associated with at least the subset of pixels of image 404 are passed onto CPU 208 for processing. Alternatively (not shown in FIG. 4), feature extractor circuit 410 is turned off. In such case, second keypoints of image 404 are not extracted and only first keypoint information 408 is passed onto CPU 208 for processing.

CPU 208 builds a model describing correspondence between image 402 and image 404. CPU 208 searches for correspondences between first keypoint information 408 of image 402 and second keypoint information 412 of image 404 to generate at least one motion vector representing relative movement in image 402 and image 404. In one embodiment, CPU 208 correlates (matches) first keypoint information 408 with second keypoint information 412, e.g., by comparing and pairing keypoint descriptors extracted from images 402 and 404 to determine a set of keypoint information matches (e.g., pairs of keypoint descriptors extracted from images 402 and 404). CPU 208 then performs a model fitting algorithm by processing the determined set of keypoint information matches to build the model. The model fitting algorithm may be designed to discard false matches during the model building process. The model fitting algorithm may be based on, e.g., the iterative random sample consensus (RANSAC) algorithm. The model built by CPU 208 includes information about mapping between pixels in the images 402 and 404. The model may represent a linear, affine and perspective transformation. Alternatively, the model may be a non-linear transformation. Based on the model, warping parameters (mapping information) 418 may be generated by CPU 208 and sent to warping circuit 428 for spatial transformation of image 402 and/or image 404. Warping parameters 418 can be used in a form of a matrix for spatial transformation (e.g., warping) of image 402 and/or image 404. The matrix for spatial transformation represents a geometric transformation matrix or a mesh grid with motion vectors defined for every grid point. Alternatively, a dedicated circuit instead of CPU 208 may be provided to perform the RANSAC algorithm and to generate warping parameters 418.

In the embodiment when feature extractor circuit 410 is turned off and only first keypoint information 408 is passed onto CPU 208, CPU 208 generates a motion vector for each of the first keypoints of image 402. This is done by performing, e.g., the NCC search within an expected and configurable displacement range to determine a best feature match within a defined spatial vicinity (patch) of each first keypoint of image 402. In such case, CPU 208 performs a model fitting algorithm (e.g., the RANSAC algorithm) that uses first keypoint information 408 (e.g., coordinates of the first keypoints) and corresponding motion vectors determined based on feature matches to build a model, whereas matching of keypoints between images 402 and 404 is not performed. The model fitting algorithm may be designed to discard false feature matches. Based on the built model, CPU 208 generates warping parameters (mapping information) 418 that is sent to warping circuit 428 for spatial transformation of image 402. Alternatively, a dedicated circuit instead of CPU 208 may be provided to perform the NCC search and to generate a motion vector for each of the first keypoints of image 402. In such case, CPU 208 uses the motion vector for each of the first keypoints generated by the dedicated circuit to build the model.

Image 402, which may be a long exposure image, is also passed onto image enhancement processor 420 that performs certain processing of image 402, e.g., noise removal, enhancement, etc., to obtain processed version 422 of image 402. Processed version 422 is passed onto clipping marker circuit 424. Clipping marker circuit 424 identifies clipped (e.g., oversaturated) pixels in processed version 422 of image 402 having one or more color component values that exceed threshold values as clipping markers. Clipping marker circuit 424 may replace the pixel values with predetermined pixel values so that any of these pixels or any other pixel derived from these pixels downstream from clipping marker circuit 424 can be identified and addressed appropriately in subsequent processing, such as corresponding morphological operations (e.g., erosion or dilation) of the clipping markers. For example, the morphological operations can be conducted during a warping operation performed by warping circuit 428, during a pyramid generation performed by pyramid generator circuit 432, and/or during a fusion operation performed by image fusion processor 444.

Warping circuit 428 accommodates the linear and non-linear transformations defined by the model generated by CPU 208. Warping circuit 428 warps processed image 426 using the mapping information according to the warping parameters 418 to generate warped version 430 of image 402 (e.g., warped image 430) spatially more aligned to image 404 than to image 402. Alternatively (not shown in FIG. 4), warping circuit 428 warps image 404 using the mapping information in the model to generate warped version 430 of image 404 spatially more aligned to image 402 than to image 404. Warped image 430 generated by warping circuit 428 is then passed onto pyramid generator circuit 432. The warping circuit 428 may also perform image resampling to scale the image by a fractional value.

Pyramid generator circuit 432 generates multiple downscaled warped images each having a different resolution by sequentially downscaling warped image 430. Each downscaled warped image includes multiple color components. The downscaled warped images obtained from warped image 430 may be stored in e.g., system memory 230 (not shown in FIG. 4). Low frequency components of the downscaled warped images and a low frequency component of an unscaled single color version (e.g., luma component) of warped image 430 are passed as warped image data 434 onto image fusion processing circuit 444 for fusion with corresponding image data 442 obtained from image 404. The operation of the pyramid generator circuit will be discussed in further details in FIG. 5 through FIG. 7. Note that in some embodiments, image enhancement processor 420, clipping locator circuit 424, warping circuit 428, and pyramid generator circuit 432 are part of noise processing stage 310. In some embodiments, one or more of the image enhancement processor 420, clipping locator circuit 424, warping circuit 428, and pyramid generator circuit 432 are outside of noise processing stage 310, such as in another stage of back-end pipeline stages 340.

Image enhancement processor 436 performs certain processing of image 404 (e.g., noise removal, enhancement, etc.) to obtain processed image 438 for passing onto pyramid generator circuit 440. Pyramid generator circuit 440 generates multiple downscaled images each having a different resolution by sequentially downscaling processed image 438. Each downscaled image generated by pyramid generator circuit 440 includes the multiple color components (e.g., luma and chroma components). The downscaled images obtained from processed image 438 may be stored in, e.g., system memory 230. Low frequency components of the downscaled images and a low frequency component of an unscaled single color version (e.g., luma component) of processed image 438 are passed onto image fusion processing circuit 444 as image data 442. Note that image enhancement processor 436 and pyramid generator circuit 440 may also be part of noise processing stage 310.

Image fusion processing circuit 444 performs per-pixel blending between a portion of warped image data 434 related to the unscaled single color version of warped image 430 with a portion of image data 442 related to the unscaled single color version of processed image 438 to generate an unscaled single color version of fused image 446. Image fusion processing circuit 444 also performs per-pixel blending between a portion of warped image data 434 related to a downscaled warped image (obtained by downscaling warped image 430) and a portion of image data 442 related to a corresponding downscaled image (obtained by downscaling processed image 438) to generate first downscaled version 448 of the fused image comprising the multiple color components. First downscaled version 448 has a pixel resolution equal to a quarter of a pixel resolution of unscaled single color version 446. Unscaled single color version 446 and first downscaled version 448 are passed onto post-processing circuit 450 for further processing and enhancement.

Post-processing circuit 450 is part of color processing stage 312 and performs post-processing of unscaled single color version 446 and first downscaled version 448 to obtain post-processed fused image 472. Post-processing circuit 450 includes sub-band splitter (SBS) circuit 452, local tone mapping (LTM) circuit 458, local contrast enhancement (LCE) circuit 462, sub-band merger (SBM) circuit 466 and sharpening circuit 470. SBS circuit 452 performs sub-band splitting of unscaled single color version 446 to generate high frequency component of unscaled single color version 454 passed onto SBM circuit 466. SBS circuit 452 also performs sub-band splitting of first downscaled version 448 to generate low frequency component of first downscaled version 456 passed onto LTM circuit 458. LTM circuit 458 performs LTM operation on low frequency component of first downscaled version 456 to generate a processed version of low frequency component of first downscaled version 460 passed onto LCE circuit 462. LCE circuit 462 performs local photometric contrast enhancement of a single color component (e.g., luma component) of processed version of low frequency component of first downscaled version 460 to generate enhanced version of first downscaled version of fused image 464. SBM circuit 466 merges high frequency component of unscaled single color version 454 and enhanced version of first downscaled version of fused image 464 to generate merged fused image data 468 passed onto sharpening circuit 470. Sharpening circuit 470 performs sharpening (e.g., photometric contrast enhancement) on a single color component (e.g., luma component) of merged fused image data 468 to generate post-processed fused image 472. Post-processed fused image 472 can be passed to output rescale 314 and then output interface 316. The processing performed at post-processing circuit 450 is merely an example, and various other post-processing may be performed as an alternative or as an addition to the processing at post processing circuit 450.

Example Architecture for Pyramid Generation and Image Fusion

Figure 5:
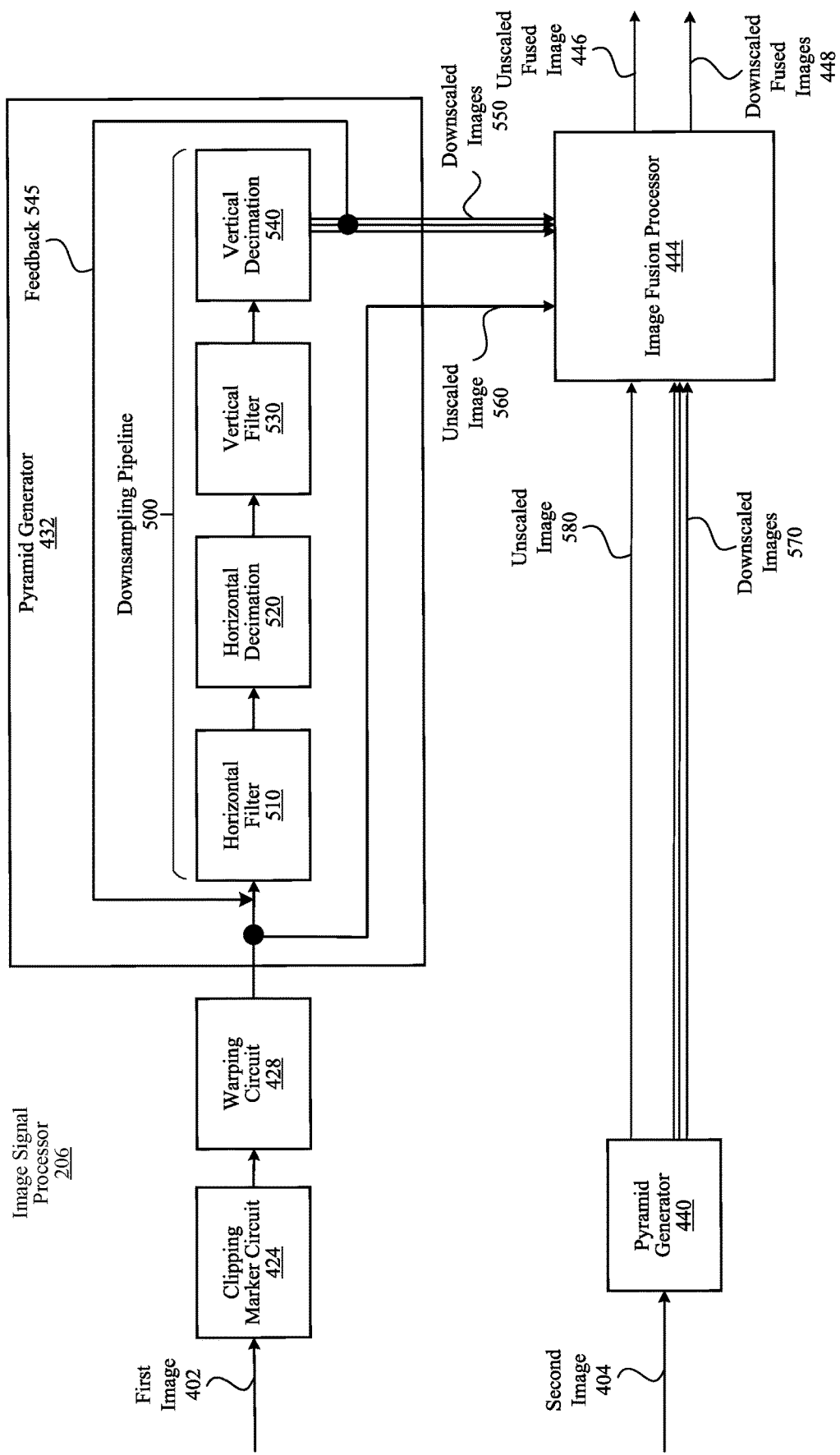
FIG. 5 is a block diagram illustrating a portion of a pyramid generator and image fusion pipeline, according to one embodiment.

FIG. 5 is a block diagram of a pyramid generation and image fusion pipeline, according to one embodiment. The components in FIG. 5 may belong to a part of the image signal processor 206, and more specifically, a portion of the image processing pipeline shown in FIG. 4. Some of the components in FIG. 4 are not shown. In various embodiments, the pyramid generation and image fusion pipeline may include different components or additional or fewer components.

A clipping marker circuit 424 receives an image 402 (which may be a version of the image 402 such as a processed version 422 shown in FIG. 4) and clip pixel values that are beyond a predetermined range. The predetermined range may restrict color values in a color space (e.g., YCbCr or RGB color space). The predetermined range may represent a range of suitable color values that correspond to a pixel that is neither under-exposed or over-exposed. In one embodiment, the predetermined range may have a lower boundary value and an upper boundary value for a color channel. For example, the lower boundary value may be 0 and the upper boundary value may be 1023 for a color channel. A pixel having a value in a color channel (e.g., luminance, chrominance, R, G, B, etc.) that is lower than the lower boundary value may be considered under-exposed. Likewise, a pixel having a value in a color channel that is higher than the upper boundary value may be considered over-exposed.

The clipping marker circuit 424 identifies pixel values that are beyond the predetermined range and replace the pixel values with one or more clipped pixel values. For example, if the image 402 is a long exposure image, the clipping marker circuit 424 may identify a pixel value (e.g., 1057) that is beyond the upper boundary value (e.g., 1023) and replace the pixel value with a clipped pixel value. The clipped pixel value may take a predetermined value such as the upper boundary value or a value that is beyond the boundary as the replaced value. Likewise, the clipping marker circuit 424 may identify under-exposed values that are lower than the lower boundary value and replace those values with clipped pixel values, which may the lower boundary value.

The identification of over-exposure and under-exposure may be carried out for different color channels. In one embodiment, the clipping marker circuit 424 may receive the image 402 in YCbCr. For a pixel of the image 402, the clipping marker circuit 424 may determine whether any of the luminance or chrominance values are beyond the predetermined range. Additionally, or alternatively, the clipper marker may convert the pixel values in image 402 into the RGB format and determine whether any of the color values are beyond the predetermined range in any color channel.

The clipping marker circuit 424 may mark the clipped pixel values in various ways. In one embodiment, the over-exposed or under-exposed values are clipped to a predetermined value such as the boundary value, which also serves as markers for subsequent components in the image processing pipeline. Put differently, subsequent components may treat any pixel values at the boundary values as clipped pixel values. In another embodiment, the clipping marker circuit 424 may have a separate identifier that marks any pixel values that have been clipped.

The warping circuit 428 performs various linear or non-linear transformations to distort, transform and map an image. The warping circuit 428 may also apply one or more resampling filters to rescale the number of pixels by a fractional ratio. The filters may include different kinds of convolution kernels that transform the image. Each color channel may have a different kind of convolution kernels or different values in the kernels. The resampling process may include filtering, interpolation and decimation that may be performed together in a single step or separately in multiple steps. In performing the filtering, interpolation and decimation, the warping circuit 428 may identify any filtered pixels that are generated from one or more clipped pixel values. The warping circuit 428 may mark the identified filtered pixels with a tag indicating that the identified filtered pixels are generated from the clipped pixel values.

A pyramid generator circuit 432 is coupled to the warping circuit 428 or the clipping marker circuit 424 (directly or indirectly) and generates one or more images from the image 402 that may have one or more clipped pixel values. The one or more images generated may be unscaled or downscaled. An unscaled image has the same number of pixels of the image 402. A downscaled image has a lower number of pixels of the image 402. In one embodiment, the pyramid generator circuit 432 may generate a downscaled image 550 using the downsampling pipeline 500 and an unscaled image 560. In some cases, the pyramid generator circuit 432 may repeatedly feed, through a feedback 545, a first downscaled image to the downscaling pipeline 500 to generate a second downscaled image that is further downscaled from the first downscaled image. In one embodiment, the feedback is performed N−1 times to feed a downscaled image back to the downsampling pipeline 500 to generate a further downscaled image. Accordingly, N images (e.g., an unscaled image 560 and N−1 downscaled images 550) are generated by the pyramid generator circuit 432. With respect to the unscaled image 560, it may include values of a single channel. For example, the pyramid generator circuit 432 may extract the luminance values of various pixels of the image 402 and generate the unscaled image 560 that has only the luminance values. Put differently, in one embodiment, the unscaled image 560 may be a greyscale version of the image 402. In other embodiments, the pyramid generator circuit 432 may generate the unscaled image 560 using one or more channels (e.g., Cb, Cr, R, G, or B). The downscaled image 550 may include full channels such as the luminance channel and two chrominance channels.

The downscaling pipeline 500 receives an image and downscales the image to a reduced number of pixels through one or more filters and one or more downscaling process. In general, the downscaling pipeline 500 applies one or more image filters to the image 402 to generate a filtered image. A pixel in the filtered image may be generated from a subset of multiple pixels in the image 402. For example, one of the filters may be a finite impulse response (FIR) filter that generates filtered pixels, which may be weighted averages of different subsets of pixels in the image 402. Other filters, such as Gaussian, frequency (e.g., high pass, low pass), mean, median, smoothing, blurring, sharpening, un-sharpening, box filters, etc., may also be used. The downscaling pipeline 500 identifies one or more of the filtered pixels that are generated from one or more pixel values that are clipped by the clipping marker circuit 424. The downscaling pipeline 500 marks the identified filtered pixels in the filtered images with a tag. The tag indicates that the identified filtered pixels in the filtered images are generated from one or more clipped pixel values. The tag may be referred to as an invalid tag. In one embodiment, the downscaling pipeline 500 may also mark other pixels that are not generated with any of the clipped pixel values with a normal tag. The downscaling pipeline 500 also decimates the filtered image to generate the downscaled image 550 that has a reduced number of pixels compared to the image 402. The downscaled image 550 may include one or more pixels that are marked with the tag to identify for other downstream image processing components the pixel locations that are generated from clipped pixel values.

In the downscaling pipeline 500, the filtering, marking, and decimation processes to generate a downscaled image may be performed by one or more circuits. By way of example, the downscaling pipeline 500 may include a horizontal filter circuit 510, a horizontal decimation circuit 520, a vertical filter circuit 530, and a vertical decimation circuit 540. In various embodiments, the pyramid generator circuit 432 may include different components or additional or fewer components. For example, in one embodiment, the pyramid generator circuit 432 may perform horizontal and vertical filtering together by using one or more N×M kernels that convolve with the image. N and M may be the same number or a different number. The horizontal and vertical decimations may also be performed in a separable (vertical followed by horizontal, or vice versa) or a non-separable (vertical and horizontal together) fashion.

By way of example, the horizontal filter circuit 510 may apply a filter in the horizontal direction to filter a horizontal subset of pixels in a row of the image 402. The filtering may include different types of computation specified by the filter to mix the values in the subset of pixels. For example, for a filtered pixel in the filtered image, the horizontal filter circuit 510 may include a horizontal FIR filter that generates a filtered value that is a weighted average of a horizontal subset of pixels corresponding to the filtered pixel. In applying the horizontal filter, the horizontal filter circuit 510 may apply padding to the image to preserve the pixel size of the image in the horizontal direction. The horizontal filter circuit 510 may also identify one or more filtered pixels that are generated from clipped pixel values and mark the identified filtered pixels with the tag. The downscaling pipeline 500 may also include a horizontal decimation circuit 520 that decimates the filtered image by a ratio. For example, the decimation ratio may be 2:1 such that the horizontal decimation circuit 520 skips every other pixel in generating a downscaled image. Other ratios are also possible in various embodiments.

The vertical filter circuit 530 may be similar to the horizontal filter circuit 510. The vertical filter circuit 530 may apply a filter in the vertical direction to filter a vertical subset of pixels in a column of the image 402. The filtering may also include different types of computation specified by the filter. For example, for a filtered pixel in the filtered image, the vertical filter circuit 530 may include a vertical FIR filter that generates a filtered value that is a weighted average of a vertical subset of pixels corresponding to the filtered pixel. In applying the vertical filter, the vertical filter circuit 510 may apply padding to preserve the pixel size of the images in the vertical direction. The vertical filter circuit 510 may also identify one or more filtered pixels that are generated from clipped pixel values and mark the identified filtered pixels with the tag. The downscaling pipeline 500 may also include a vertical decimation circuit 540 that decimates the filtered image by a ratio. For example, the decimation ratio may also be 2:1, which may be the same as the horizontal decimation. Other ratios are also possible in various embodiments.

The particular arrangement of the downscaling pipeline 500 shown in FIG. 5 is for example only. In one embodiment, the vertical filter circuit 530 and the vertical decimation circuit 540 may instead be located upstream of the horizontal filter circuit 510 and the horizontal decimation circuit 520. In another embodiment, the horizontal and vertical filtering and decimation may be combined and performed together. In various embodiments, the decimation ratio may be the same or different for horizontal and vertical decimation. The horizontal and vertical filters may also be the same or different. In one embodiment, the horizontal filter circuit 510 may include more than one filters, such as a first filter specific to filtering a first channel (e.g., luminance values) and a second filter specific to filtering a second channel (e.g., chrominance values). The first and second filter may be of the same support size but may have different values such as different weights. For example, both filters may be FIR filters but specify different weights in the filters. Likewise, the vertical filter circuit 530 may also include different filters for luminance values and chrominance values.

The terms horizontal and vertical (or rows and columns) may describe two relative spatial relationships. While, for the purpose of simplicity, a column described herein is normally associated with a vertical line of an image, it should be understood that a column does not have to be arranged vertically (or longitudinally). Likewise, a row does not have to be arranged horizontally (or laterally). Vertical and horizontal directions in this disclosure may also be referred to as a first direction and a second direction that is different from the first direction. The two directions also do not necessarily mandate any specific spatial relationship such as any parallel or perpendicular arrangement.

In some cases, the image signal processor 206 also receives a second image 404. The second image 404 may capture the same scene as the first image 402 but have a different exposure time. For example, the first image 402 may be a long exposure image and the second image 40 may be a short exposure image. A pyramid generator circuit 440 may process the second image 404 to generate a plurality of images, which may include a plurality of downscaled images 570 and an unscaled image 580. The pyramid generator circuit 440 may have the same or different structure and arrangement as the pyramid generator circuit 432. For example, in one embodiment, the pyramid generator circuit 440 may convert the second image 404 to the downscaled image 570 that includes full color channels using filters and downscaling ratios that are similar to the pyramid generator circuit 432 but the pyramid generator circuit 440 does not mark any pixels with a tag. In another embodiment, since the second image 404 may be a short exposure image, the second image 404 may be clipped for pixels that are under-exposed. The pyramid generator circuit 440 may mark the filtered pixels in the filtered image that are generated from the clipped pixels similar to the process of the pyramid generator circuit 432. With respect to the unscaled image 580, it may be similar to the unscaled image 560, which may only have a single color channel. For example, the pyramid generator circuit 440 may extract the luminance values of the second image so that the unscaled image 580 may be a greyscale version of the second image 404.

The image fusion processor 444 is coupled to the pyramid generator circuit 440 (directly or indirectly) and receives the images outputted from the pyramid generator circuits 432 and 440 to generate one or more fused images 446 and 448 by fusing images of the same resolutions. For example, the image fusion processor 444 fuses the unscaled image 560 and the unscaled image 580 to generate an unscaled fused image 446. The image fusion processor 444 also fuses different pairs of a downscaled image 550 and a downscaled image 570 that have the same resolution to generate a plurality of downscaled fused images 448. The image fusion processor 444 may receive N images from each pyramid generator circuit.

The fusing may be a per-pixel blending between two images. For example, in fusing a pair of downscaled images 550 and 570, for a pixel of the fused image 448, the image fusion processor 444 may blend the pixel values that correspond to the same pixel location in the downscaled images 550 and 570. The blending may include taking a weighted average to generate a fused pixel of the fused image 448. In performing the fusion, the image fusion processor 444 identifies filtered pixels in the downscaled image that are marked with an invalid tag that indicates the filtered pixels are generated from one or more clipped pixel values. The image fusion processor 444 disregards those filtered pixels that are marked with the invalid tag. For example, for a first fused pixel of the downscaled fused image 448 that is to be generated from a first filtered pixel that is not marked with the invalid tag in the downscaled image 550, the image fusion processor 444 determines a first weighted average between the first filtered pixel in the downscaled image 550 and a first corresponding pixel in the downscaled image 570. In contrast, for a second fused pixel that is to be generated from a second filtered pixel that is marked with the invalid tag in the downscaled image 550, the image fusion processor 444 disregards the second filtered pixel in the downscaled image 550 and uses a second corresponding pixel in the downscale image 570 that is not marked with an invalid tag as the value of the second fused pixel.

The first and second fused images 446 and 448 may be combined to generate a high dynamic range image that has a dynamic range higher than the first image 402 and the second image 404.

Example Filtering and Decimation

Figure 6:
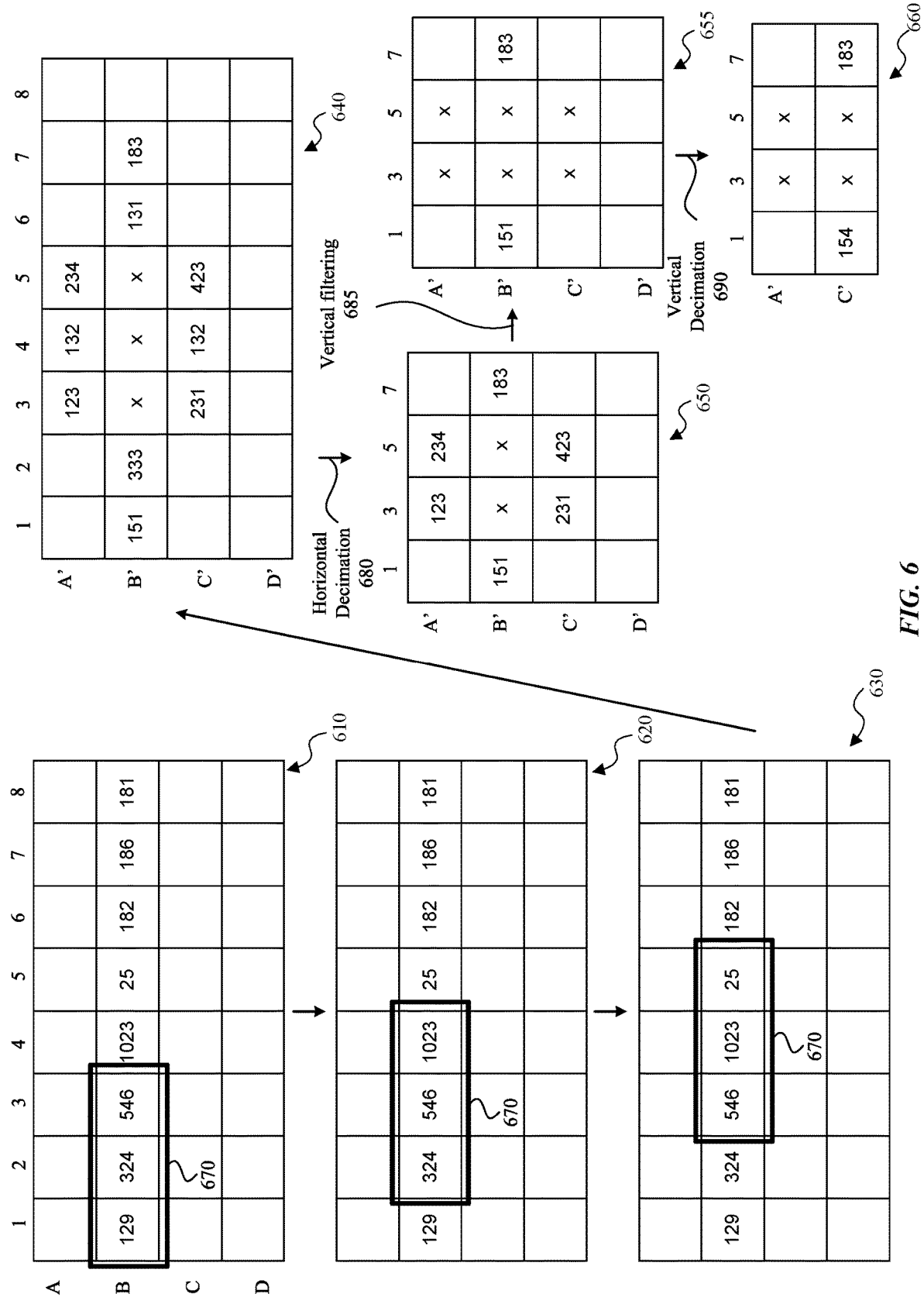
FIG. 6 is a series of conceptual diagrams illustrating a filtering and downscaling process in a pyramid generator circuit, according to one embodiment.

FIG. 6 is a series of conceptual diagrams illustrating a filtering and decimation process that may be performed by the image signal processor's one of the image processing circuit, such as the pyramid generator circuit 432, according to an embodiment. The warping circuit 428 may also perform a similar image processing operation. For illustration, the figure is described using the pyramid generator circuit 432, but in different embodiments other image processing circuits may also perform a similar operation. Pixel blocks 610, 620, and 630 show the same image, such as the image 402 shown in FIG. 5, with a filter 670 that is applied at different pixels. Pixel block 640 shows a first filtered image. Pixel block 650 shows a second filtered and decimated image. Pixel block 655 shows an image that is both vertically and horizontally filtered. Pixel block 660 shows a final downscaled image, such as the downscaled image 550 shown in FIG. 5. While FIG. 6 shows 32 pixels in the image 402, an actual image 402 may be in a higher resolution and may include millions of pixels. A single pixel may be associated with a set of values, which represent values of different color channels. For simplicity, only example values of one of the color channels for some of the pixels of the images are shown. Also, not all pixel values are shown.

The pyramid generator circuit 432 may apply a horizontal filter 670 to the image. Pixel blocks 610, 620, and 630 show the horizontal filter 670 applied at different locations. The support size of the horizontal filter 670 may be selectable by the pyramid generator circuit 432, such as by an external command. For example, the support size of the horizontal filter 670 is 1×3. In other words, the horizontal filter 670 filters pixel values of the middle pixel with the pixel values of two adjacent pixels, one left and one right of the middle pixel. In another case, the pyramid generator circuit 432 may select a 1×5 filter that filters pixel values of the middle pixel with the pixel values of four adjacent pixels, two left and two right of the middle pixel. In yet other cases, the pyramid generator circuit 432 may select a 1×7 filter or a 1×9 filter. The pixels that are selected for filtering may also not be symmetric about the middle pixel. In another embodiment, the pyramid generator circuit 432 may perform filtering and decimation in both horizontal and vertical direction together. In such an embodiment, the filter may a 3×3 kernel, 5×5 kernel, 7×7 kernel, etc. and the support window size of the kernel may be selectable by the pyramid generator circuit 432.

The pyramid generator circuit 432 may use an FIR filter to filter the pixel values and applies a morphological erosion mask to mark filtered pixels with an invalid tag. Using morphological erosion, the pyramid generator circuit 432 marks a filtered pixel with the invalid tag if one or more of the pixel values in the subset of pixels that are used to generate the filtered pixel is a clipped pixel value. The pyramid generator circuit 432 may identify the clipped pixel value by tags in the input image or alternatively find the pixels whose values are equal to a predetermined value that is at the boundary or outside the valid pixel range (e.g., 1023 or value that is larger than 1023). For example, the pyramid generator circuit 432 may treat a pixel value having the boundary value of a predetermined range as a clipped pixel value. For example, if the predetermined range is between 0 and 1023, the pyramid generator circuit 432 may identify the pixel B4 in the input image as a clipped pixel value.

In pixel block 610, the filter 670 is applied at the pixel B2. The filter 670 may be an FIR filter that filters the pixel values of a subset of pixels. When the filter 670 is applied at the pixel B2, the subset of pixels includes the pixel B2 and the two pixels that are adjacent to the pixel B2 (e.g., pixels B1 and B3). The weighted average may be a simple average that weights the three pixel values equally or a weighted average that weights the middle pixel more heavily than the adjacent pixels. For the purpose of illustration, a simple average is used in the example shown in FIG. 6. As a result, the filtered pixel value for pixel B'2 of the filtered image shown in pixel block 640 may take the value of 333, which is the average of the pixel values B1, B2, and B3 in the subset of pixels.

In pixel block 620, the filter 670 is shifted to pixel B3. The subset of pixels that are used to generate the filtered pixel B'3 in the filtered image in pixel block 640 becomes pixels B2, B3, and B4. As such, the filtered pixel value for pixel B'3 may be an average of the pixels B2, B3, and B4. The pyramid generator circuit 432 identifies that the pixel B4 has the boundary value 1023. Hence, the pyramid generator circuit 432 treats the pixel B4 as a clipped pixel value. Since the filtered pixel B'3 of the filtered image in the pixel block 640 is generated from one or more clipped pixel values, the pyramid generator circuit 432 marks the filtered pixel with an invalid tag indicating that the filtered pixel B'3 is generated from one or more of the clipped pixel values. The invalid tag may take different forms in various embodiments. For example, in one embodiment, the invalid tag may be a tag value (e.g., 0) that is different from the tag value (e.g., 1) of pixels that are not generated from any clipped pixel values. The tag values may be separated from the pixel values and may be stored in different registers of the pyramid generator circuit 432. In another embodiment, a pixel value may be used directly as a tag. For example, for a filtered pixel that is generated from one of the clipped pixel value, the pyramid generator circuit 432 may force the filtered pixel value to a boundary value (e.g., 1023) regardless what the average value is. As such, downstream components and pipelines, such as the image fusion processor 444, may identify those filtered pixels by the boundary value. In yet another embodiment, the pyramid generator circuit 432 may both use a tag that is separated from the pixel value and force the pixel value to the boundary value. For illustration, the filtered pixels that are generated from one of the clipped pixel values are marked with a cross X in FIG. 6.

In pixel block 630, the filter 670 is shifted to pixel B4. Since pixel B4 is a clipped pixel value, the filtered pixel B'4 in the filtered image shown in pixel block 640 is marked with an invalid tag. Likewise, when the filter 670 is shifted to pixel B5 (not shown in FIG. 6), the filtered pixel B'5 is still generated from the clipped pixel value in the pixel B4. As such, the filtered pixel B'5 is also marked with an invalid tag. For the filtered pixel B'6, the subset of pixels in the input image that generates the filtered pixel B'6 includes pixels B5, B6, and B7. None of the pixels in this subset is a clipped pixel value. As such, the pyramid generator circuit 432 generates a weighted average value in filtered pixel B'6. In pixel block 640, assume that no pixel in the rows A' and C' is generated from a clipped pixel value. The filtered pixel values at A'3, A'4, A'5, C'3, C'4, and C'5 are also shown.

The pyramid generator circuit 432 may apply a horizontal decimation, as indicated by the arrow 680. The horizontal decimation may reduce the number of columns by half. Hence, columns 2, 4, 6, 8 in the filtered image shown in pixel block 640 are removed.

The pyramid generator circuit 432 may also apply a vertical filter, as indicated by the arrow 685. In applying vertical filtering, since the filtered pixels B'3 and B'5 are marked with an invalid tag, the pyramid generator circuit 432 performs a morphological erosion to spread the invalid tags to vertically adjacent pixels. As such, filtered pixels A'3, A'5, C'3, and C'5 are also marked with the invalid tag in pixel block 655. As a result of using an erosion mask as one of the filters, the number of filtered pixels that are marked with the invalid tag in a filtered image becomes larger than the number of pixels in the input image (e.g., image 402) that are associated with clipped pixel values. The pyramid generator circuit 432 may select the extent of erosion by applying filters of different sizes. For example, the invalid tag may be spread to more pixels when a filter of support size 5 is applied instead of the filter 670 of support size 3.

The pyramid generator circuit 432 may further vertically decimate the filtered image shown in pixel block 650 to generate a downscaled image shown in pixel block 660. When the input image includes one or more clipped pixel values, the downscaled image may include one or more pixels that are marked with the invalid tag.

Example Resampline Process

Figure 7:
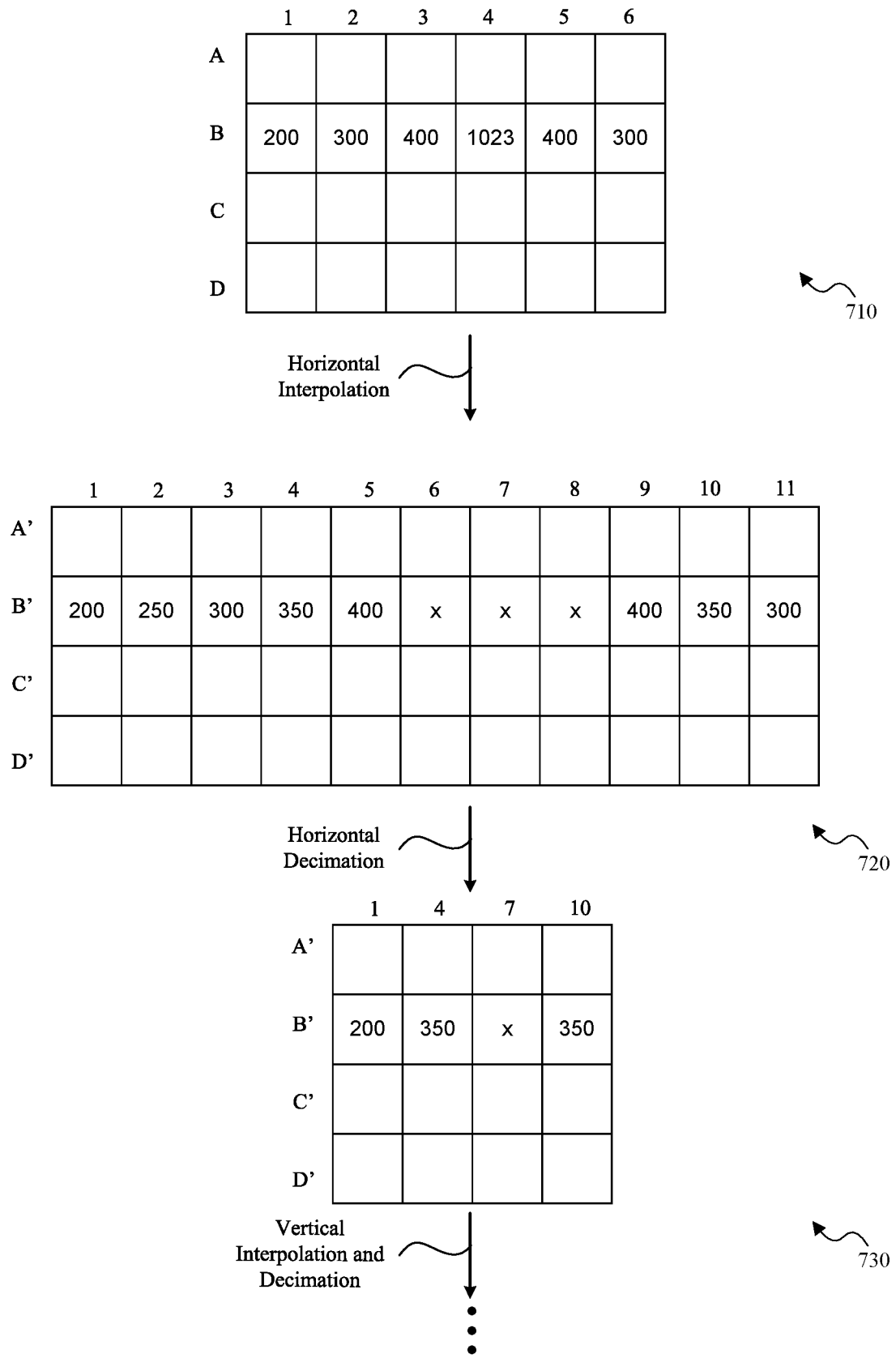
FIG. 7 is a series of conceptual diagrams illustrating a resampling process in a warping circuit, according to one embodiment.

FIG. 7 is a series of conceptual diagrams illustrating a resampling process that may be performed by the image signal processor's one of the image processing circuits, such as the warping circuit 428, according to an embodiment. The pyramid generator circuit 432 may also perform a similar image processing operation. For illustration, the figure is described using the warping circuit 428, but in different embodiments other image processing circuits may also perform a similar operation.

A resampling process may include one or more interpolation processes and one or more decimation processes to change the number of pixels of an image by a resampling ratio. The resampling ratio may be a fractional value such as ⅔. In one embodiment, the resampling ratio may be 1536/2304, 1152/1536, or other suitable ratios for the image signal processor. In addition to interpolation and decimation, the warping circuit 428 may carry out a filtering process that applies one or more filters such as different kinds of convolution kernels to perform image distortion, transformation, and mapping. The filtering may be similar to the filtering process illustrated in FIG. 6. The precise filtering process may depend on the coefficients and support windows of the filters. The filtering process is not repeated in FIG. 7.

Pixel block 710 illustrates an input image of a warping circuit 428, such as the processed image 426 shown in FIG. 4. Pixel block 720 shows an interpolated image and pixel block 730 shows a decimated image. Similar to FIG. 6, while the pixel block 710 in FIG. 7 shows only 24 pixels, an actual image may be in a higher resolution and may include millions of pixels. A single pixel may be associated with a set of values, which represent values of different color channels. For simplicity, only example values of one of the color channels for some of the pixels in row B of the images are shown.

In performing a resampling process, the warping circuit 428 may interpolate the pixel values of the image by a first ratio and decimate the interpolated image by a second ratio that is different from the first ratio. The types of interpolation used may depend on the embodiments. In one embodiment, the interpolation may be separable into horizontal interpolation and vertical interpolation. The window size of the interpolation and filter may be in any suitable size such as 1×2, 1×3, and 1×4. In another embodiment, the vertical and horizontal interpolation is non-separable. Put differently, the vertical and horizontal interpolations are carried out together. A 4×4 bicubic interpolation, a 2×2 bilinear interpolation, or any other suitable interpolations may be used.

In FIG. 7, a horizontal interpolation that increases the number of pixels by a ratio of 2 is illustrated. Pixel block 720 shows an interpolated image that includes a plurality of filtered pixels. In generating an interpolated value, the warping circuit 428 determines the value based on original pixel values. For example, in one embodiment, the filtered pixel value B'2 in the interpolated image in pixel block 720 is 250, which is interpolated from the pixels B1 and B2 in the pixel block 710. Likewise, the filtered pixel value B'4 and B'10 respectively have the interpolated values of 350 and 350. In performing the interpolation, the warping circuit 428 may mark a filtered pixel with an invalid tag if the interpolation is derived from one or more pixels having values that are marked as clipped. The warping circuit 428 may identify the clipped pixel value by tags in the input image or alternatively find the input pixels whose values are equal to a predetermined value that is at the boundary or outside the valid pixel range (e.g., 1023 or value that is larger than 1023). For example, pixel B4 in the pixel block 710 is identified as a clipped value. As a result, the filtered pixels B'6 and B'8, which are generated from interpolation of pixels that include the pixel B4 in the pixel block 710, are marked with a cross X in FIG. 7, which represent an invalid tag. In another embodiment, the marking may also be done by forcing the filtered pixels B'6 and B'8 that a predetermined value such as 1023 to signify the filtered pixels are invalid. For example, the interpolated value for the filtered pixels B'6 and B'8 should be about 712. However, because pixel B4 is a clipped value, the filtered pixels B'6 and B'8 are either marked with a cross X or being forced to take the value 1023. The filtered pixel B'7 takes the value of the input pixel B4 in pixel block 710. Hence, it is also marked with a cross X.

The warping circuit 428 also decimate the filtered image shown in pixel block 720 to generate a decimated image shown in pixel block 730. The decimation ratio may be different from the interpolation ratio. In the example shown in FIG. 7, a decimation ratio of 3 is used for the horizontal direction. As a result, every three pixels may be extracted to the decimated image. Hence, the decimated image shows pixel values in columns 1, 4, 7, and 10. Any pixel marked with the invalid tag is continued to be marked so. Before or after the horizontal interpolation and horizontal decimation, a vertical interpolation and decimation may be carried out. In some embodiments, horizontal and vertical image processing may be carried in a single step. Filtering, interpolation, and decimation may also be carried in a single step by applying convolution kernel, padding, striding, and other suitable image processing technique. Output pixels that are generated from clipped pixel values are marked as invalid.

Example Pyramid Generation and Image Fusion Process

Figure 8:
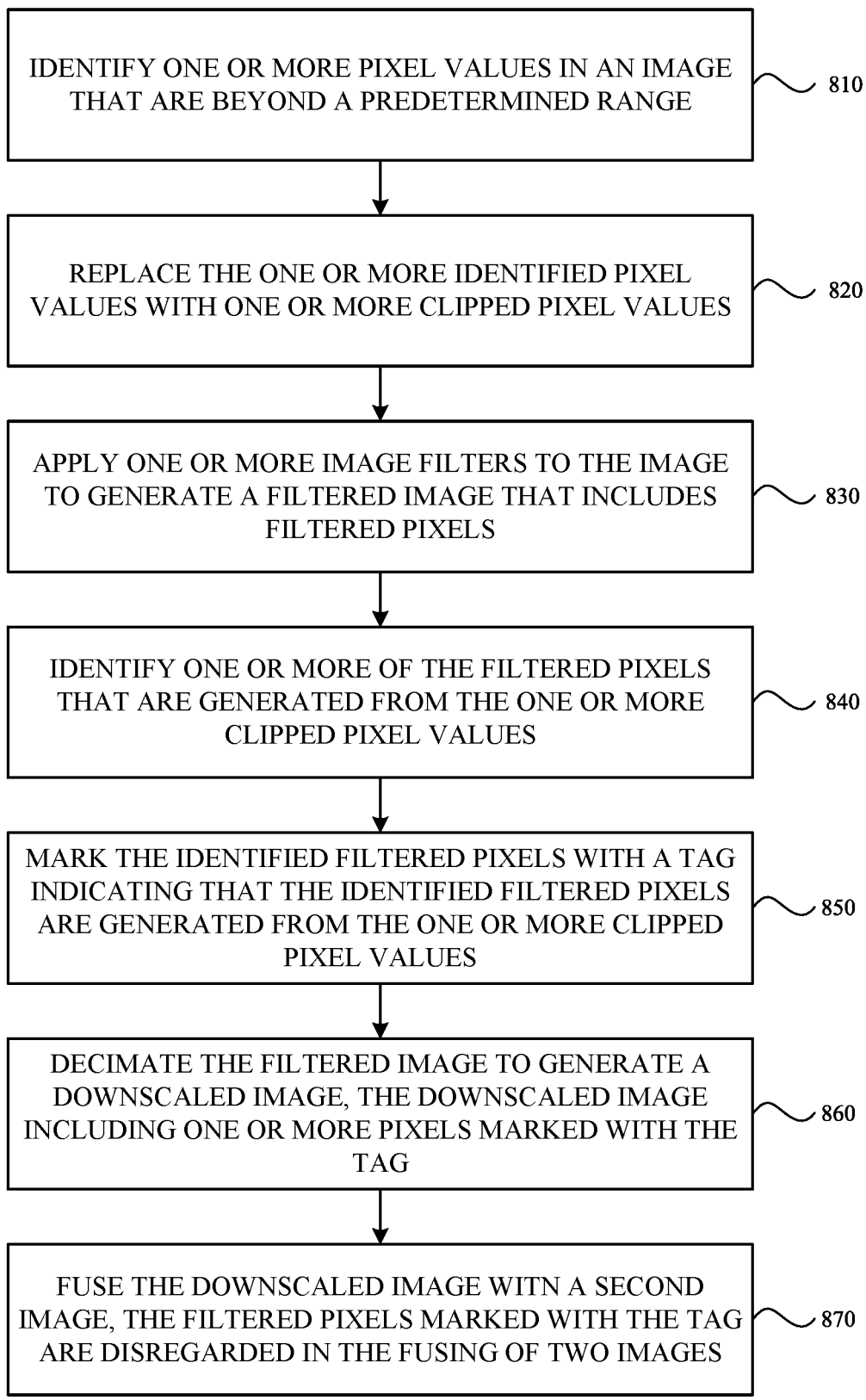
FIG. 8 is a flowchart illustrating a method of image fusion processing, according to one embodiment.

FIG. 8 is a flowchart depicting an example pyramid generation and image fusion process that may be performed by an image signal processor, according to an embodiment. A portable electronic device may include an image sensor system that captures a plurality of images of a same scene.

The plurality of images may include a first image that corresponds to a first exposure time and a second image that corresponds to a second exposure time that is shorter than the first exposure time. The portable electronic device may also include an image signal processor that fuses the two images to generate a high dynamic range image for display in the touch screen of the portable electronic device.

By way of example, the image signal processor receives the first image and the second image from the image sensor system. The image signal processor identifies 810 one or more pixel values in an image that are beyond a predetermined range. The image may be the first image, which is the long exposure image. The image signal processor replaces 820 the one or more identified pixel values with one or more clipped pixel values. For example, the image signal processor may set the pixel values that are beyond the predetermined range to a boundary value.

The image signal processor may include a pyramid generator circuit that generates one or more downscaled images of the image that is inputted to the pyramid generator circuit (e.g., the first image). In one embodiment, the pyramid generator circuit applies 830 one or more image filters to the image to generate a filtered image that includes filtered pixels. A filtered pixel may be generated from a subset of pixels in the input image. The filters may specify the computations used for the filtering, which may include averaging, blurring, sharpening, etc. The application of the filters may include padding to make the support size of the filtered image in the application direction of the filter (e.g., horizontal or vertical) the same as the input image.

The image signal processor identifies 840 one or more of the filtered pixels that are generated from the one or more clipped pixel values in the input image. For example, in one embodiment, the image signal processor may generate one of the filtered pixels from a subset of pixel values of the input image. The image signal processor may determine that one of the pixel values in the subset has a boundary value of the predetermined range. In response to one of the pixel values in the subset of the input image has the boundary value, the image signal processor may treat such pixel as having a clipped pixel value. In another embodiment, the image signal processor may identify the clipped pixel values by other methods. For example, the input image may have tags that are labeled by a clipping marker circuit that is upstream of the pyramid generator circuit.

The image signal processor marks 850 the identified filtered pixels with a tag indicating that the identified filtered pixels are generated from the one or more clipped pixel values. In one embodiment, the pixels in the input image may be assigned with pre-assigned with a normal tag. When one of the filtered pixels that are generated from a clipped pixel value is identified, the normal tag of the identified filtered pixel is replaced with an invalid tag. Additionally, or alternatively, the image signal processor may also set the pixel value in the identified filtered pixel to the boundary value of the predetermined range. The boundary value may serve as a tag indicating that the filtered pixel is generated from a clipped pixel value. The image signal processor decimates 860 the filtered image to generate a downscaled image having a reduced number of pixel compare to the image. The downscaled image may include one or more pixels marked with the invalid tag.

The image signal processor may also receive a second image captured by the image sensor system. The image signal processor downscales the second image to generate a second downscaled image. The image signal processor fuses 870 the first downscaled image generated from the first image with a version of the second image, such as the downscaled second image. In the fusion, the resolution of the two downscaled images may be the same. The image signal processor may perform a per-pixel blending to blend a first pixel from the first downscaled image with a corresponding second pixel from the second downscaled image the filtered pixels to generate a fused pixel. In the fusion, the filtered pixels in the first downscaled image that are marked with the invalid tag are disregarded. For example, when the first pixel from the first downscaled image is marked with the invalid tag, the image signal processor disregards the first pixel and takes a second pixel from the second downscaled image at the corresponding location of the first pixel as the value of the fused pixel in the fused image.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An image signal processor, comprising:
a clipping circuit configured to:
identify one or more pixel values in an image that are beyond a predetermined range; and
replace the one or more identified pixel values with one or more clipped pixel values; and
a pyramid generator circuit coupled to the clipped circuit and configured to:
apply one or more image filters to the image to generate a filtered image that comprises filtered pixels;
identify one or more of the filtered pixels that are generated from the one or more clipped pixel values;
mark the identified filtered pixels with a tag indicating that the identified filtered pixels are generated from the one or more clipped pixel values; and
decimate the filtered image to generate a downscaled image having a reduced number of pixels compared to the image, the downscaled image comprising one or more pixels marked with the tag, wherein the downscaled image is configured to be fused with a second image to generate a fused image, wherein the filtered pixels in the downscaled image marked with the tag are disregarded in the fusing.

2. The image signal processor of claim 1, further comprising:
a fusion circuit coupled to the pyramid generator circuit and configured to:
receive the downscaled image from the pyramid generator circuit and a second image, the downscaled image from the pyramid generator circuit and the second image capturing a same scene with different exposure times; and
fuse the downscaled image with the second image to generate the fused image.

3. The image signal processor of claim 2, wherein the fusion circuit is further configured to:
receive a first unsealed image generated from the image;
receive a second unsealed image, the second unsealed image being an unsealed version of the second image that is downscaled; and
fuse the first and second unsealed images to generate a second fuse image.

4. The image signal processor of claim 1, further comprising:
a warping circuit coupled to the pyramid generator circuit and configured to:
interpolate pixel values in the image to generate an interpolated image;
identify one or more interpolated pixel values that are generated from the one or more clipped pixel values;
mark the identified interpolated pixel values with the tag; and
decimate the interpolated image.

5. The image signal processor of claim 1, wherein the one or more image filters comprising a horizontal finite impulse response (FIR) filter and a vertical FIR filter and one of the filtered pixels is a weighted average of a subset of pixel values in the image.

6. The image signal processor of claim 1, wherein identify one or more of the filtered pixels that are generated from the one or more clipped pixel values comprises:
generate one of the filtered pixels from a subset of pixel values of the image;
determine that one of the pixel values in the subset has a boundary value of the predetermined range; and
identify that the one of the filtered pixels is generated from the one or more clipped pixel values responsive to one of the pixel values in the subset has the boundary value.

7. The image signal processor of claim 1, wherein the one or more image filters comprises an erosion mask, and wherein a number of filtered pixels marked with the tag in the filtered image is larger than a number of pixels in the image associated with clipped pixel values.

8. The image signal processor of claim 1, wherein a support size of at least one of the image filters is selectable by the pyramid generator circuit.

9. The image signal processor of claim 1, wherein the one or more filters comprises a luminance filter and a chrominance filter that is different from the luminance filter.

10. The image signal processor of claim 1, wherein the pyramid generator circuit is further configured to generate an unscaled image in addition to the downscaled image, the unsealed image having a same number of pixels of the image and having luminance values only.

11. A method of operating an image signal processor comprising a pyramid generator circuit, the method comprising:
identifying one or more pixel values in an image that are beyond a predetermined range;
replacing the one or more identified pixel values with one or more clipped pixel values;
applying one or more image filters to the image to generate a filtered image that comprises filtered pixels;
identifying one or more of the filtered pixels that are generated from the one or more clipped pixel values;
marking the identified filtered pixels with a tag indicating that the identified filtered pixels are generated from the one or more clipped pixel values; and
decimating the filtered image to generate a downscaled image having a reduced number of pixels compared to the image, the downscaled image comprising one or more pixels marked with the tag, wherein the downscaled image is configured to be fused with a second image to generate a fused image, wherein the filtered pixels in the downscaled image marked with the tag are disregarded in the fusing.

12. The method of claim 11, further comprising:
receiving a second image different from the downscaled image, the downscaled image and the second image capturing a same scene with different exposure times; and
fusing the downscaled image with the second image to generate the fused image.

13. The method of claim 12, wherein fusing the downscaled image with the second image to generate the fused image comprises:
for a first fused pixel of the fused image that corresponds to a first filtered pixel in the downscaled image that is not marked with the tag, determining a first weighted average of the first filtered pixel in the downscaled image and a first corresponding pixel in the second image; and
for a second fused pixel of the fused image that corresponds to a second filtered pixel in the downscaled image that is marked with the tag, using a second corresponding pixel in the second image as the second fused pixel and disregarding the second filtered pixel.

14. The method of claim 11, further comprising:
interpolating pixel values in the image to generate an interpolated image;
identifying one or more interpolated pixel values that are generated from the one or more clipped pixel values;
marking the identified interpolated pixel values with the tag; and
decimating the interpolated image.

15. The method of claim 11, wherein identifying one or more of the filtered pixels that are generated from the one or more clipped pixel values comprises:
generating one of the filtered pixels from a subset of pixel values of the image;
determining that one of the pixel values in the subset has a boundary value of the predetermined range; and
identifying that the one of the filtered pixels is generated from the one or more clipped pixel values responsive to one of the pixel values in the subset has the boundary value.

16. The method of claim 11, wherein the one or more image filters comprises an erosion mask, and wherein a number of filtered pixels marked with the tag in the filtered image is larger than a number of pixels in the image associated with clipped pixel values.

17. An electronic device, comprising:
an image sensor system configured to capture a plurality of images of a same scene, the plurality of images comprising a first image and a second image, the first image corresponding to a first exposure time and the second image corresponding to a second exposure time shorter than the first exposure time; and
an image signal processor configured to:
identify one or more pixel values in the first image that are beyond a predetermined range;
replace the one or more identified pixel values with one or more clipped pixel values;
apply one or more image filters to the first image to generate a filtered image that comprises filtered pixels;
identify one or more of the filtered pixels that are generated from the one or more clipped pixel values;
mark the identified filtered pixels with a tag indicating that the identified filtered pixels are generated from the one or more clipped pixel values; and
decimate the filtered image to generate a first downscaled image having a reduced number of pixels compared to the first image, the first downscaled image comprising one or more pixels marked with the tag, wherein the downscaled image is configured to be fused with a second image to generate a fused image, wherein the filtered pixels in the downscaled image marked with the tag are disregarded in the fusing.

18. The electronic device of claim 17, wherein the image signal processor is further configured to:
- downscale the second image to generate a second downscaled image; and
- fuse the first downscaled image with the second downscaled image to generate the fused image.

19. The electronic device of claim 18, wherein the image signal processor is further configured to:
- generate a first unsealed image from the first image, the first unsealed image including only luminance values of the first image;
- generate a second unsealed image from the second image, the second unsealed image including only luminance values of the second image; and
- fuse the first and second unsealed images to generate a second fused image different from the fused image.

20. The electronic device of claim 19, wherein the image signal processor is further configured to:
- generate a high dynamic range image by combining the first fused image and the second fused image, the high dynamic range image having a higher contrast than the first image and than the second image.

* * * * *